United States Patent
Davies (10) Patent No.: US 8,707,525 B2
(45) Date of Patent: Apr. 29, 2014

(54) FASTENER ASSEMBLY AND METHOD OF USING A FASTENER ASSEMBLY

(75) Inventor: Christopher Davies, Lake Orion, MI (US)

(73) Assignee: Fauceria Interior Systems, Inc., Auburn Hills, MI (US)

( * ) Notice: Subject to any disclaimer, the term of this patent is extended or adjusted under 35 U.S.C. 154(b) by 216 days.

(21) Appl. No.: 13/196,571

(22) Filed: Aug. 2, 2011

(65) Prior Publication Data

US 2013/0031752 A1   Feb. 7, 2013

(51) Int. Cl.
*F16B 21/08*   (2006.01)

(52) U.S. Cl.
USPC .............. 24/453; 24/292; 24/297; 403/408.1; 411/508

(58) Field of Classification Search
USPC ............ 24/292, 297, 289, 293, 453; 296/191; 403/408.1; 411/508, 510
See application file for complete search history.

(56) References Cited

U.S. PATENT DOCUMENTS

| | | |
|---|---|---|
| 3,367,383 A | 2/1968 | Neuschotz |
| 5,152,582 A | 10/1992 | Magnuson |
| 6,070,902 A | 6/2000 | Kowalski et al. |
| 6,594,870 B1 | 7/2003 | Lambrecht et al. |
| 6,715,185 B2 | 4/2004 | Angellotti |
| 7,328,489 B2 | 2/2008 | Leverger et al. |
| 7,785,030 B2 * | 8/2010 | Klein .................. 403/408.1 |
| 2005/0029778 A1 | 2/2005 | Weber et al. |
| 2006/0000064 A1 * | 1/2006 | Leverger et al. ........... 24/297 |

FOREIGN PATENT DOCUMENTS

| | | |
|---|---|---|
| EP | 0648944 A1 | 4/1995 |
| EP | 0761986 A2 | 3/1997 |

* cited by examiner

*Primary Examiner* — Robert J Sandy
*Assistant Examiner* — Michael Lee
(74) *Attorney, Agent, or Firm* — Ingrassia Fisher & Lorenz, P.C.

(57) ABSTRACT

A fastener assembly and for joining a first body to a second body and a method for using the fastener assembly are disclosed herein. The fastener assembly includes, but is not limited to, a base component that is configured for engagement with the first body. The base component includes a class A surface. The fastener assembly further includes a fastening component that is connected to the base component and that extends therefrom. The fastening component is configured to translate for a predetermined distance with respect to the base component. The fastening component is further configured to engage the second body. The fastener assembly still further includes a biasing feature that is configured to urge the fastening component towards a substantially concentric arrangement with respect to the base component.

14 Claims, 11 Drawing Sheets

FASTENER ASSEMBLY AND METHOD OF USING A FASTENER ASSEMBLY

TECHNICAL FIELD

The technical field generally relates to the joining of separate bodies to one another, and more particularly relates to a fastener assembly and a method of using a fastener assembly for joining two bodies.

BACKGROUND

The assembly of an automobile entails the attachment of multiple components to a core structure such as a unibody or a ladder-type frame. Many of the components are manufactured by one or more suppliers and then delivered to an original equipment manufacturer ("OEM") for final assembly. The dimensions for each component that is to be attached to the automobile are specified by the OEM.

Because of limitations that are inherent in manufacturing processes and techniques, the actual dimensions of the component typically varies slightly from the dimensions that were specified for the component. For example, a molded plastic part will experience shrinkage as it cools. The shrinkage will impact the dimensions of the plastic part. The amount of shrinkage experienced by the plastic part will depend upon the time allotted for cooling, the temperature at which the plastic part cools, the precise formulation of the plastic materials used to mold the plastic part, and other factors. The cooling time, the cooling temperature, and the precise formulation of the plastic material cannot be controlled with absolute precision. Accordingly, unanticipated and unpredictable variations will arise in the amount of shrinkage experienced by a molded plastic part that will lead to variations in the dimensions of the component that is fabricated from the plastic part. The processes used to fabricate components from materials other than plastic also have limitations that will result in the component having dimensions that vary slightly from the specifications.

In recognition of this real-world circumstance, when specifying dimensions for components, the OEM will also specify a tolerance or acceptable deviation from the specified dimension. For example, when specifying that a component shall have a length of 100 cm, the OEM may also specify that the component will be acceptable if its length falls within 1.5 mm of 100 cm.

When components that deviate from their specified dimensions are attached to other components that also deviate from their specified dimensions, their respective dimensional deviations will be compounded. This is known as "stack up". One consequence of stack up is that the attachment opening (an opening that is configured to receive a fastener) of one component may fail to align with the attachment opening of another component. In other words, instead of being concentric with one another, the attachment openings will be eccentric with respect to one another. When attachment openings of differing components are eccentric, the use of a standard fastener can cause one or both components to skew from its nominal position. In some cases, this skewing may have an aesthetically displeasing impact on the fit and finish of the components being joined, including the occurrence of gaps and/or buckling.

An earlier attempt to resolve this problem was disclosed in U.S. Pat. No. 3,367,383, issued to Neuschotz (hereinafter, "the '383 patent"). The '383 patent describes a fastener assembly that includes a threaded element carried by an outer body where the threaded element was free to move laterally with respect to the outer body. The outer body could be positioned concentrically within an attachment opening of a first component while the threaded element could be positioned concentrically within an attachment opening of a second component even though the two attachment openings were eccentrically oriented with respect to one another. Thus, the '383 patent's fastener permitted the components to be joined together without being skewed.

This solution, however, gives rise to a significant problem. The threaded element of the '383 patent's fastener is free to slide with respect to the outer body and therefore will be randomly and unpredictably positioned with respect to the outer body. As a result, the '383 patent's fasteners will be non-uniform (i.e., they will each have slightly different configurations). This, in turn, will introduce inefficiency into the process of assembling a vehicle. An assembly line worker seeking to insert the '383 patent's fastener into misaligned attachment openings will need to take additional time to visibly inspect or tactilely determine the location of the threaded element with respect to the outer body in order to accurately insert the threaded element into the misaligned attachment openings. This may render the '383 patent's fastener difficult and/or time consuming to use and, in extreme cases, may cause injuries to the hand and/or fingers of the assembly line worker.

Accordingly, it is desirable to provide an easy-to-use fastener that can join together two components having misaligned attachment openings. In addition, it is desirable to provide a method for use of such a fastener. Furthermore, other desirable features and characteristics will become apparent from the subsequent detailed description and the appended claims, taken in conjunction with the accompanying drawings and the foregoing technical field and background.

SUMMARY

A fastener assembly for joining a first body to a second body and a method for using a fastener assembly to join a first body to a second body are disclosed herein.

In a first non-limiting embodiment, the fastener assembly includes, but is not limited to, a base component that is configured for engagement with the first body. A surface of the base component comprises a class A surface. The fastener assembly further includes a fastening component that is connected to the base component and that extends therefrom. The fastening component is configured to translate for a predetermined distance with respect to the base component and is further configured to engage the second body. The fastener assembly still further includes a biasing feature that is configured to urge the fastening component towards a substantially concentric arrangement with respect to the base component.

In another non-limiting embodiment, a method is disclosed for using a fastener assembly to join a first body to a second body. The fastener assembly has a base component configured for engagement with the first body. A surface of the base component comprises a class A surface. A fastening component is connected to the base component and extends therefrom. The fastening component is configured to translate for a predetermined distance with respect to the base component, and further configured to engage the second body. A biasing feature is configured to urge the fastening component towards a substantially concentric arrangement with respect to the base component. The method includes, but is not limited to aligning the first body with respect to the second body. The method further includes determining that a first attachment opening of the first body and a second attachment opening of the second body are misaligned. The method still further includes inserting the fastener assembly into the first attachment opening and the second attachment opening to join the first body to the second body.

DESCRIPTION OF THE DRAWINGS

One or more embodiments will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

An improved fastener assembly is disclosed herein. The fastener assembly of the present disclosure includes a base component that is configured to engage with a first body, such as a close-out panel, and a fastening component that is configured to engage with a second body, such as instrument panel. The base component includes a class A surface. The fastening component is configured to translate (i.e., move laterally) with respect to a base component such that in circumstances where an attachment opening of the first body and an attachment opening of the second body are eccentrically arranged when the first body and the second body are aligned with one another, the base component can, nevertheless, concentrically engage the attachment opening of the first body and the fastening component can concentrically engage the attachment opening of the second body.

In addition, a biasing element (e.g., a spring) is provided that urges the fastening component into a concentric arrangement with respect to the base component. The biasing element is configured to maintain the fastening component in a concentric arrangement with respect to the base component, and is further configured to be overcome by a force exerted by a worker seeking to insert the fastening assembly into misaligned attachment openings. Under such circumstances, the biasing element will permit the fastening component to translate with respect to the base component. Thus, the biasing element permits an assembly line worker to reliably predict the relative location of the fastening component with respect to the base component when attempting to insert the fastening assembly into misaligned attachment openings. This will eliminate the need, on the part of the assembly line worker (or any other type of worker using the fastener assembly) to use their fingers or other body parts to ascertain the location of the fastening component with respect to the base component when attempting to insert the fastener assembly into misaligned attachment openings.

An additional advantage of the fastener assembly disclosed herein is that an underside of the base component may have a substantially flat surface. This substantially flat surface may be configured to have a class "A" finish. As is well known in the automotive arts, a class "A" finish is an aesthetically pleasing finish that is suitable for display to a customer, for example, on an interior surface in a passenger compartment of a vehicle. By providing the fastener assembly with a class a finish, the attachment of components within a passenger compartment of the vehicle can be greatly simplified by eliminating the need to fabricate and attach closeouts or other components which are intended to conceal fasteners from view. The class "A" surface can also provide an assembly line worker with a cue regarding the proper orientation of the fastener assembly prior to insertion into attachment openings.

An additional advantage of the fastener assembly disclosed herein is that, in some embodiments, the fastening component may include a portion that is configured as a Christmas tree. Such a Christmas tree configuration includes a series of equal-diameter rings or protrusions that protrude laterally from the fastening component and that permit the fastening assembly to be secured to a body at various depths. Thus, a fastener assembly utilizing a Christmas tree configuration may be employed in a wider range of applications than a fastener assembly utilizing a different type of engagement feature.

An additional advantage of the fastener assembly disclosed herein is that, in some embodiments, the fastening component may include a threaded portion for engaging a body. In some embodiments, the threads of the threaded portion may provide structural support for an engagement feature of the fastener assembly that facilitates the fastener's ability to engage a body. Furthermore, in some examples, the threaded portion may comprise a helical thread to permit threaded engagement between the fastener and the body to be engaged.

An additional advantage of the fastener assembly disclosed herein is that, in some embodiments, the base component comprises a plate member connected to a collar member and the fastening component comprises a disk portion, a stud portion, and an engagement portion. This configuration permits the disk portion of the fastening component to be retained between the plate member and the collar member in a sandwich configuration for secure attachment. By designing the base component to include two discrete parts, greater flexibility is provided in the manufacturing the base component and greater flexibility is provided in the assembly of the fastener assembly.

An additional advantage of the fastener assembly disclosed herein is that, in some embodiments, the collar member has an opening, the stud portion extends through the opening, the opening has a first dimension, the stud portion has a diameter having a second dimension, and the first dimension exceeds the second dimension. This configuration inherently includes the limitation on the range of movement of the fastening component with respect to the base component and thus eliminates the need to manufacture and/or assemble additional components or structures to limit the movement of the fastening component with respect to the base component.

An additional advantage of the fastener assembly disclosed herein is that, in some embodiments, the disk portion is configured to slide with respect to the plate member and the collar member of the base component. By configuring the disk portion to slide with respect to the base component, the design of the fastener assembly can be greatly simplified. Because of this sliding relationship, there will be no need to include and/or make accommodations for bearings, wheels, gears, tracks or other complex mechanisms that are typically required when one component moves with respect to another component.

An additional advantage of the fastener assembly disclosed herein is that, in some embodiments, a plurality of raised spherical surfaces are provided to facilitate sliding movement of the fastening component with respect to the base component. By providing such raised spherical surfaces, the surface area of the fastening component that comes into contact with the base component is minimized. This, in turn, reduces the friction forces acting in opposition to movement of the fastening component as the fastening component moves with respect to the base component. As a result, the fastener assembly is easier to use.

An additional advantage of the fastener assembly disclosed herein is that, in some embodiments, the biasing feature comprises a plurality of biasing elements. By utilizing a plurality of biasing elements, the design of the biasing element can be simplified. While it is certainly possible to design and construct a single biasing element that can retain the fastening component in a concentric arrangement with respect to the base component, such a biasing element would be fairly complex. By delegating the responsibility to retain the fastening component in a concentric arrangement with respect to the base component to a plurality of biasing elements, simpler structures which are easier to manufacture may be employed.

An additional advantage of the fastener assembly disclosed herein is that, in some embodiments, the plurality of biasing elements may comprise a plurality of spring elements. The advantage of using a plurality of spring elements is that spring elements can be easily and inexpensively manufactured.

An additional advantage of the fastener assembly disclosed herein is that, in some embodiments, the plurality of spring elements comprises a plurality of curved spring arms that extend in a generally outward direction from the fastening component and that engage the base component to maintain the fastening component in a substantially concentric relationship with respect to the base component. The advantage of using a plurality of curved spring arms are that curved spring arms may be more easily and less expensively manufactured as compared with other types of springs. Additionally, in view of the small environment in which the biasing element will be operating, simple curved spring arms may provide a greater range of movement than would be provided by coil springs or other types of springs, thus permitting maximum usage of the small space that is available for movement of the disk portion with respect to the base component.

A greater understanding of the fastener assembly described above, as well as a method for using the fastener assembly may be obtained through a review of the illustrations accompanying this application together with a review of the detailed description that follows.

Figure 1:
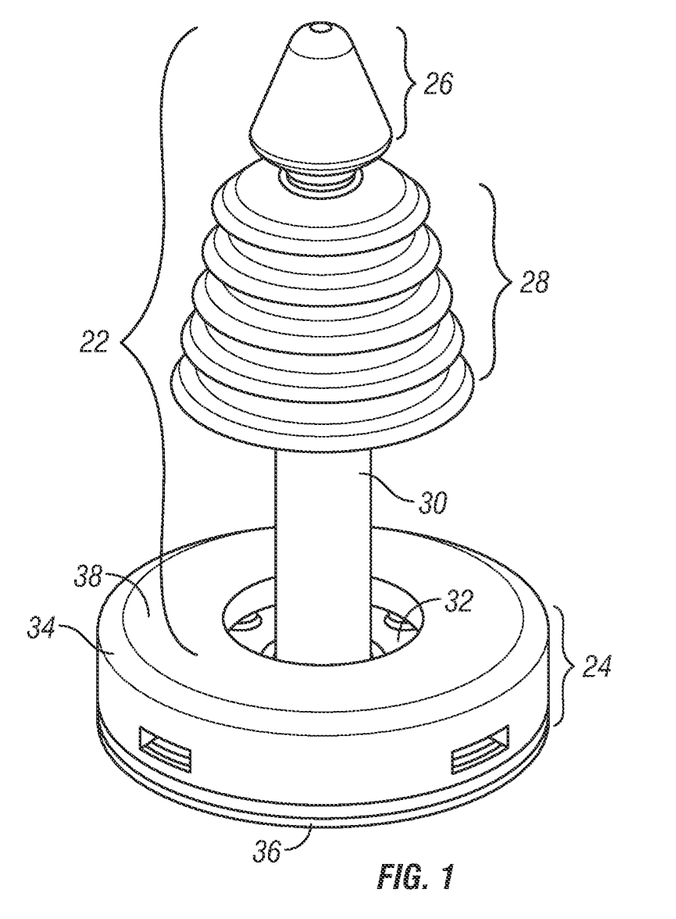
FIG. 1 is a perspective view illustrating a fastener assembly made in accordance with the teachings of the present disclosure.

FIG. 1 is a perspective view illustrating an embodiment of a fastener assembly 20 made in accordance with the teachings of the present disclosure. Fastener assembly 20 is configured to join two bodies together by extending through aligned (or misaligned) attachment openings of each body and by engaging each body. Although the context of the discussion herein is automotive in nature, it should be understood that fastener assembly 20 is not limited to use only in automotive applications. Rather, there are a wide range of uses for fastener assembly 20 including, but not limited to, use in the assembly of watercraft, recreational vehicles, aircraft, spacecraft, rail driven vehicles, as well as any other type of vehicle. Additionally, fastener assembly 20 has uses in industries other than vehicle-related industries. For example, and without limitation, fastener assembly 20 may be used in carpentry, furniture assembly, and construction.

Figure 2:
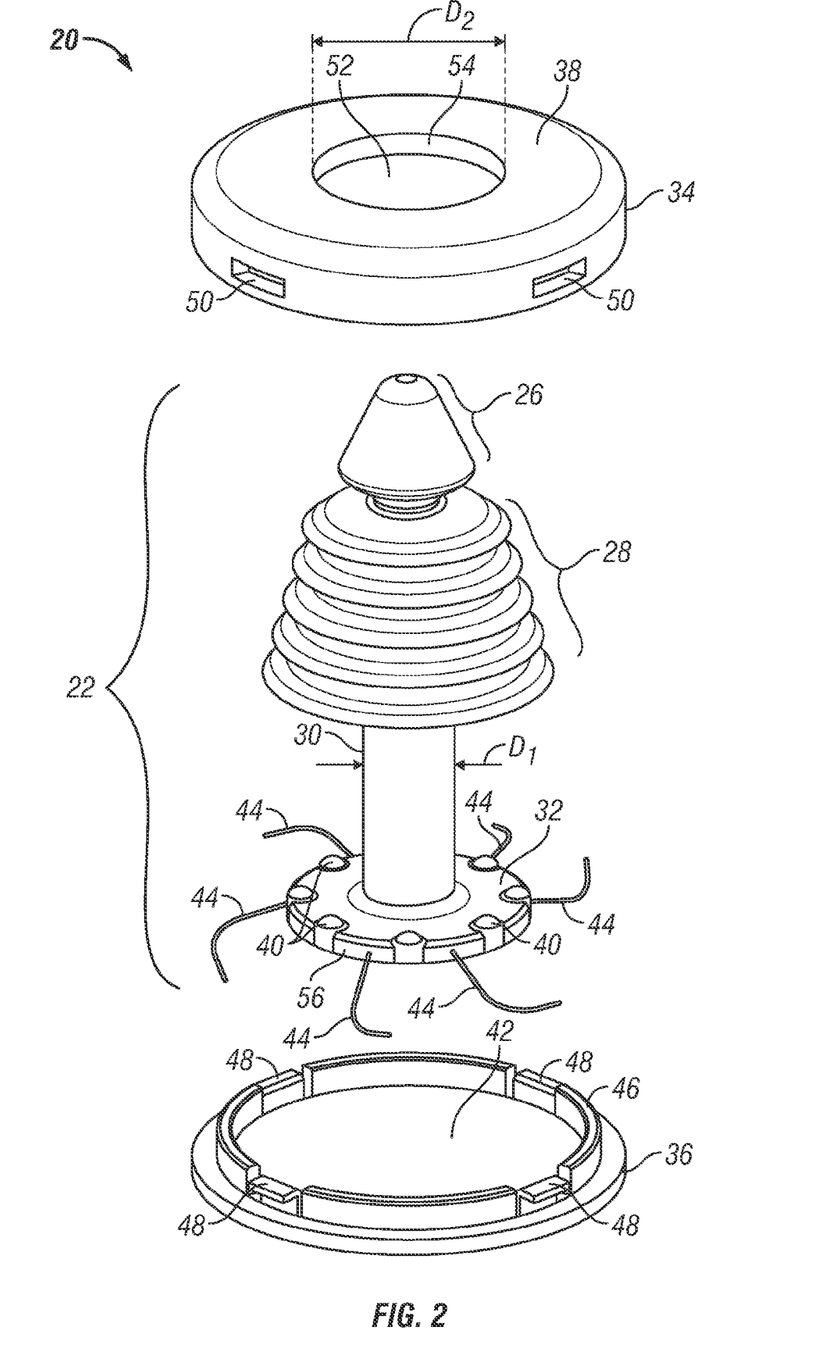
FIG. 2 is an exploded view of the fastener assembly of FIG. 1.

Fastener assembly 20 includes a fastening component 22, a base component 24, and a biasing feature (as best shown in FIG. 2). Fastening component 22 includes a lead-in portion 26. Lead-portion 26 has sloped surfaces that are configured to engage an attachment opening and to facilitate insertion of fastening components 22 through the attachment opening.

Fastening component 22 further includes an engagement portion 28. In the embodiment illustrated in FIG. 1, engagement portion 28 comprises a threaded conical structure that is configured to be compressed in a direction towards base component 24 and that is further configured to resist compression in a direction away from base component 24. As fastening component 22 is pushed through an attachment opening, engagement portion 28 is pushed up against a surface forming the attachment opening in a direction that will cause engagement portion 28 to compress. This compression permits engagement portion 28 to be pushed through the attachment opening. Once engagement portion 28 has been pushed completely through the attachment opening, the threaded conical structure will decompress and return to its initial configuration (as illustrated in FIG. 1), and will obstruct egress of fastening component 22 from the attachment opening.

While engagement portion 28 has been illustrated as a conical structure having generally parallel threads, it should be understood that other embodiments are also possible. For example, in another embodiment, engagement portion 28 may have a cylindrical configuration. In yet another embodiment, the threads around engagement portion 28 may be helical rather than parallel to permit threaded engagement with an attachment opening. In still other embodiments, engagement portion 28 may have a cylindrical configuration with helical threads.

Fastening component 22 further includes stud portion 30. Stud portion 30 supports engagement portion 28 in a spaced apart relationship with respect to base component 24 and is configured to extend through the attachment openings of the two bodies being joined.

Fastening components 22 further includes a disk portion 32 attached at an end of stud portion 30. Disk portion 32 is retained within base component 24 and is configured to move laterally with respect to base component 24. In some embodiments, disk portion 32 may be configured to slide with respect to base component 24 while in other embodiments, other types of engagement between disk portion 32 and base component 24 that permit movement are also possible. The ability of disk portion 32 to move with respect to base component 24 is what permits fastening component 22 to occupy either a concentric configuration or an eccentric configuration with respect to base component 24.

In the illustrated embodiment, engagement portion 28, stud portion 30, and disk portion 32 are different portions of a single structure. In other embodiments, engagement portion 28, stud portion 30, and/or disk portion 32 may each be separate components that are joined together by any conventional means.

Any suitable material may be used to fabricate fastener assembly 20, including, but not limited to, metals and plastics. Examples of some plastic materials that are well suited for constructing fastener assembly 20 include, but are not limited to, ABS, structured resin, and olefins. In some embodiments, the various components of fastener assembly 20 may each be comprised of different materials.

Base component 24 includes a collar member 34 connected to a plate member 36. Base component 24 is configured to retain disk portion 32 between collar member 34 and plate member 36. In the illustrated embodiment, collar member 34 and plate member 36 are connected in a snap-fit arrangement. In other embodiments, collar member 34 and plate member 36 may be joined together in any suitable manner. For example, collar member 34 and plate member 36 may be connected via a threaded engagement with one another, or via a glue or other adhesive bonding one to the other, or via a sonic weld, or by any other means effective to resiliently connect collar member 34 to plate member 36.

An underside of plate member 36 is substantially flat and finished with a class "A" surface. An upper surface 38 of collar member 34 is configured to engage an attachment opening of a body that is to be joined to another body, such as a close-out panel that is to be joined to an instrument panel.

FIG. 2 is an exploded view of fastener assembly 20. In FIG. 2, disk portion 32 can be seen without obstruction. As illustrated, disk portion 32 includes a plurality of raised spherical surfaces 40 protruding from an upper side of disk portion 32. As shown in subsequent figures, raised spherical surfaces 40 also protrude from a lower surface of disk portion 32. Raised spherical surfaces 40 are configured to engage an upper surface 42 of plate member 36 and a lower internal surface (not shown in FIG. 2) of collar member 34. By providing raised spherical surfaces 40 on an upper surface of the disk portion 32, the amount of surface contact between an upper surface of disk portion 32 and the lower internal surface of collar member 34 is reduced. Similarly, by providing raised spherical surfaces 40 on a lower surface of disk portion 32, the amount of surface contact between lower surface of disk portion 32 and upper surface 42 of plate member 36 is also reduced. By reducing the surface area of the surfaces that come into contact with one another, the magnitude of the friction forces exerted on disk portion 32 as it moves with respect to base component 24 is correspondingly reduced.

Also illustrated in FIG. 2 is biasing feature 44. In the illustrated embodiment, biasing feature 44 comprises a plurality of outwardly extending, curved spring arms extending from a periphery of disk portion 32. Each curved spring arm of biasing feature 44 is configured to engage a circular wall segment 46 extending upwardly from plate member 36. When collar member 34 is attached to plate member 36 while disk portion 32 is positioned therebetween, the curved spring arms of biasing feature 44 are constrained to remain engaged with circular wall segments 46.

When the curved spring arms are engaged with circular wall segments 46, biasing feature 44 exerts a force on disk portion 32 that urges disk portion 32 into a concentric arrangement with respect to plate member 36. The curved spring arms of biasing feature 44 may have any suitable spring constant that is appropriate to provide a desired level of resistance to movement of disk portion 32 from its concentric position with respect to plate member 36. In other embodiments, rather than using a plurality of discrete curved spring arms, any mechanism or member that is effective to exert a biasing force on disk portion 32 that is sufficient to retain disk portion 32 in a concentric relationship with respect to plate member 36 may be employed. In still other embodiments, biasing feature 44 may be attached to circular wall segments 46 and/or plate member 36 rather than extending from disk portion 32.

Circular wall segments 46 are arranged in a circular pattern and together form a circular wall near a periphery of plate member 36. Interposed between each discrete circular wall segment 46 is a snap fit engagement member 48. Collar member 34 includes a plurality of snap fit engagement receivers 50 disposed around a periphery of collar member 34 in a manner that corresponds with snap fit engagement members 48. When collar member 34 is positioned over plate member 36, snap fit engagement members 48 engage snap fit engagement receivers 50 to retain collar member 34 in an attached relationship with respect to plate member 36.

Collar member 34 includes a collar opening 52 that extends through upper surface 38 and that is defined by wall 54. Collar opening 52 is configured to permit stud portion 30 to extend through collar member 34 when collar member 34 is attached to plate member 36 while disk portion 32 is positioned therebetween. Stud portion 30 has a diameter D1 and collar opening 52 has a diameter D2. As illustrated, the magnitude of diameter D2 exceeds the magnitude of diameter D1. This difference in the magnitude of these two diameters permits movement of disk portion 32 within base component 24. The movement of disk portion 32 within base component 24 may be constrained in one of two ways. In some embodiments, this movement may be constrained by interference between stud portion 30 and wall 54. In other embodiments, movement of disk portion 32 with respect to base component 24 may be constrained by interference between an outer wall 56 of disk portion 32 and circular wall segments 46.

Figure 3:
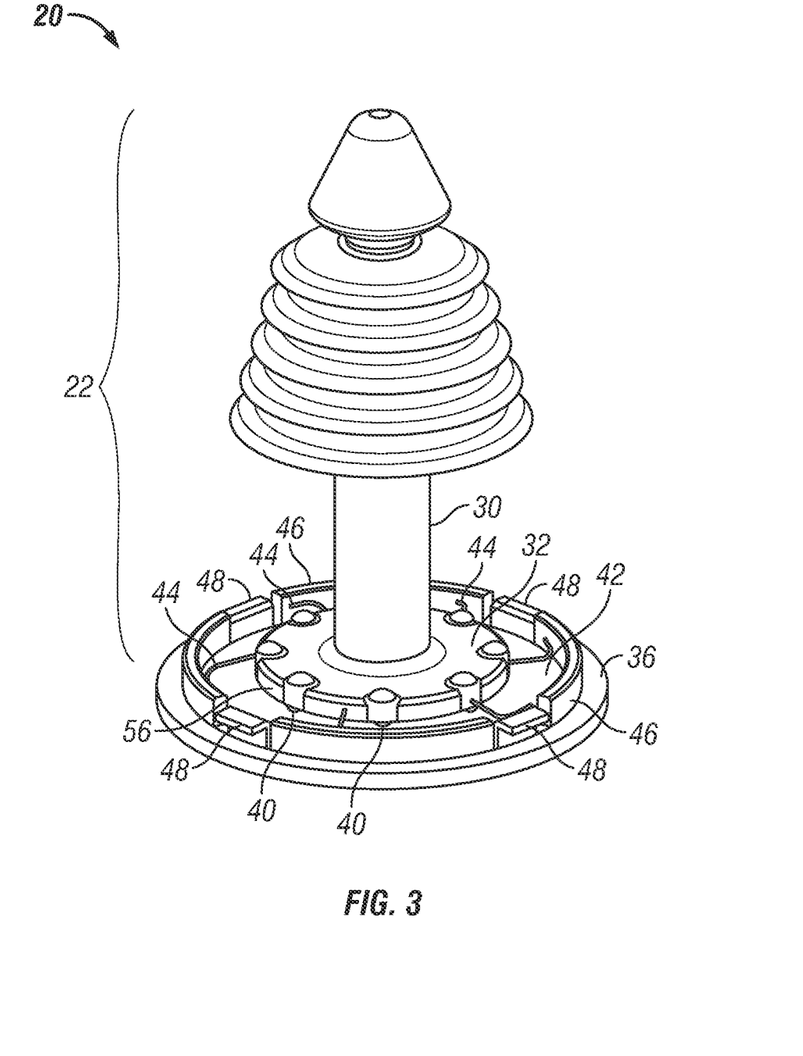
FIG. 3 is a perspective view illustrating the fastener assembly of FIG. 1 with a collar member omitted to illustrate a fastening component positioned in a substantially concentric arrangement with respect to a plate member.

FIG. 3 is a perspective view illustrating fastener assembly 20 with the collar member omitted to illustrate fastening component 22 positioned in a substantially concentric arrangement with respect to plate member 36. In FIG. 3, engagement between biasing feature 44 and circular wall segments 46 is illustrated. In the absence of any force acting transversely to fastening component 22, biasing feature 44 will maintain fastening component 22 in a concentric relationship with respect to plate member 36. Also depicted in FIG. 3 is engagement between raised spherical surfaces 40, extending from an under side of disk portion 32, and upper surface 42 of plate member 36.

Figure 4:
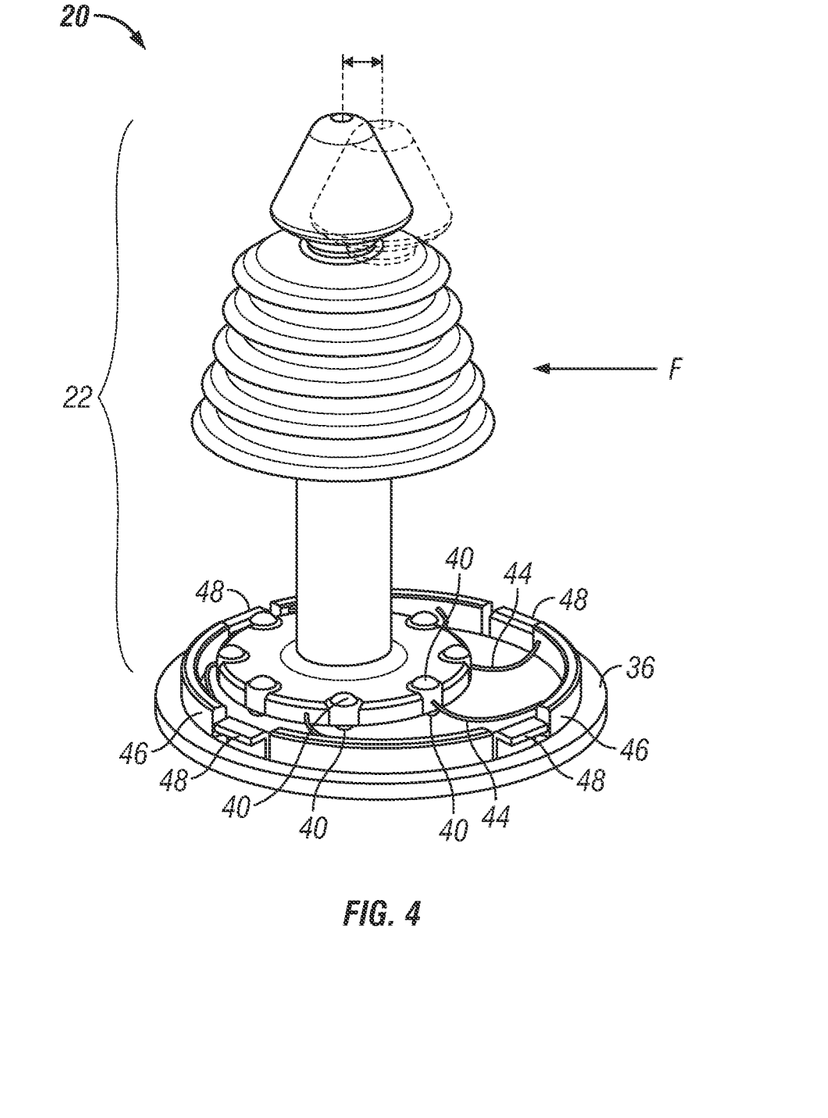
FIG. 4 is a perspective view similar to FIG. 3 illustrating a force acting on the fastening component and, as a result, the fastening component residing in a positioned that is substantially eccentric with respect to the plate member.

FIG. 4 is a perspective view of fastener assembly 20, with the collar member 34 omitted to illustrate engagement between biasing feature 44 and circular wall segments 46 as a force F acts on fastening component 22. As illustrated, force F causes the curved spring arms on the left side (from the perspective of FIG. 4) of disk portion 32 to yield and compress, thereby allowing fastening component 22 to move laterally (i.e., to translate) to the left with respect to plate member 36. As a result of such movement, fastening component 22 occupies a position that is eccentric with respect to plate member 36. When fastening component 22 is arranged eccentrically with respect to plate member 36, fastener assembly 20 is enabled to join together two bodies whose attachment openings are also eccentrically aligned.

Figure 5:
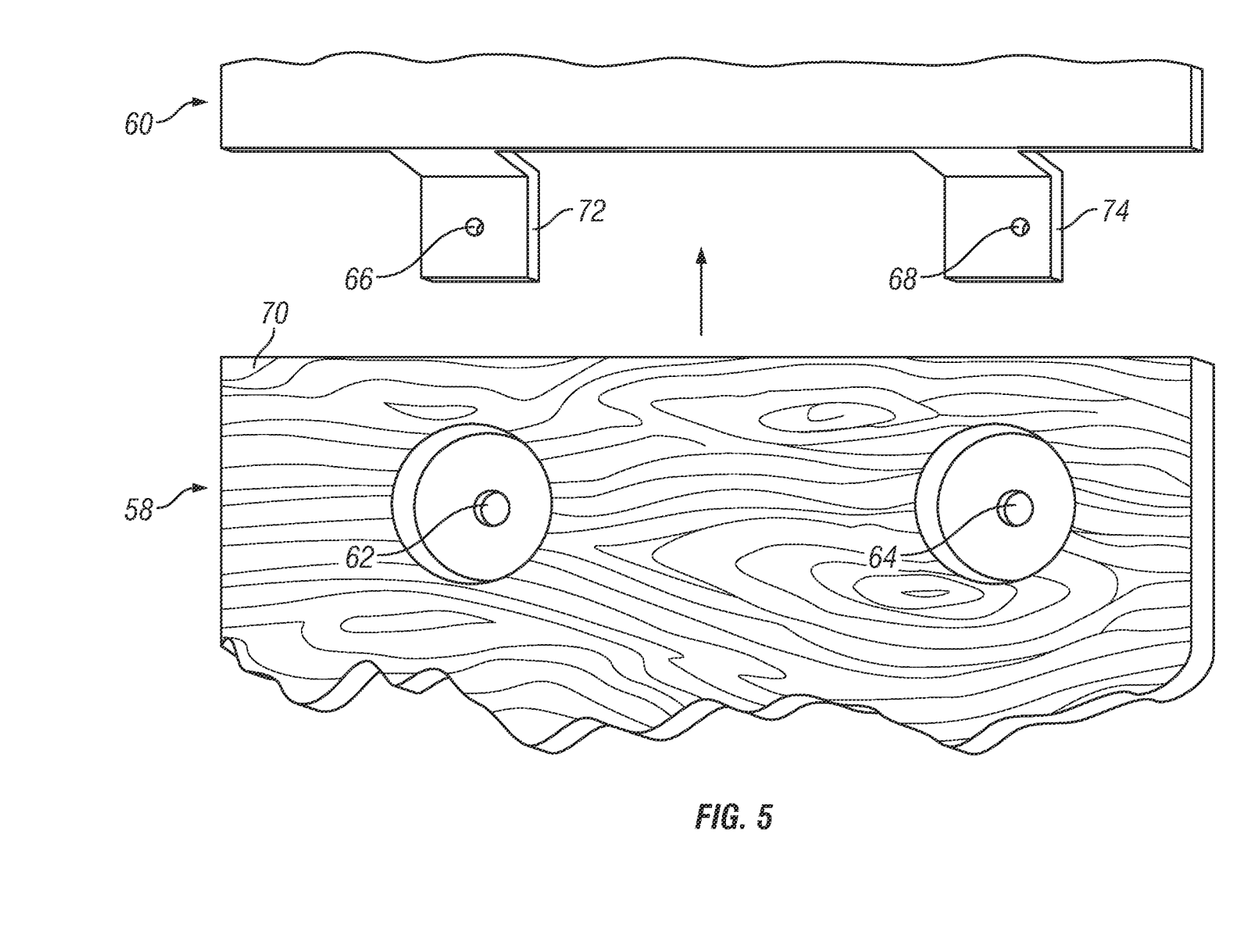
FIG. 5 is a perspective view illustrating a first body and a second body configured for attachment to one another.

FIG. 5 is a perspective view illustrating a close out panel 58 and an instrument panel 60 prior to being joined together. Close-out panel 58 includes an attachment opening 62 and an attachment opening 64, and instrument panel 60 includes an attachment opening 66 and an attachment opening 68. Attachment openings 62 and 64 have been recessed below a surface 70 of close-out panel 58 to allow an upper surface of a fastener to be positioned substantially flush with respect to surface 70.

Figure 6:
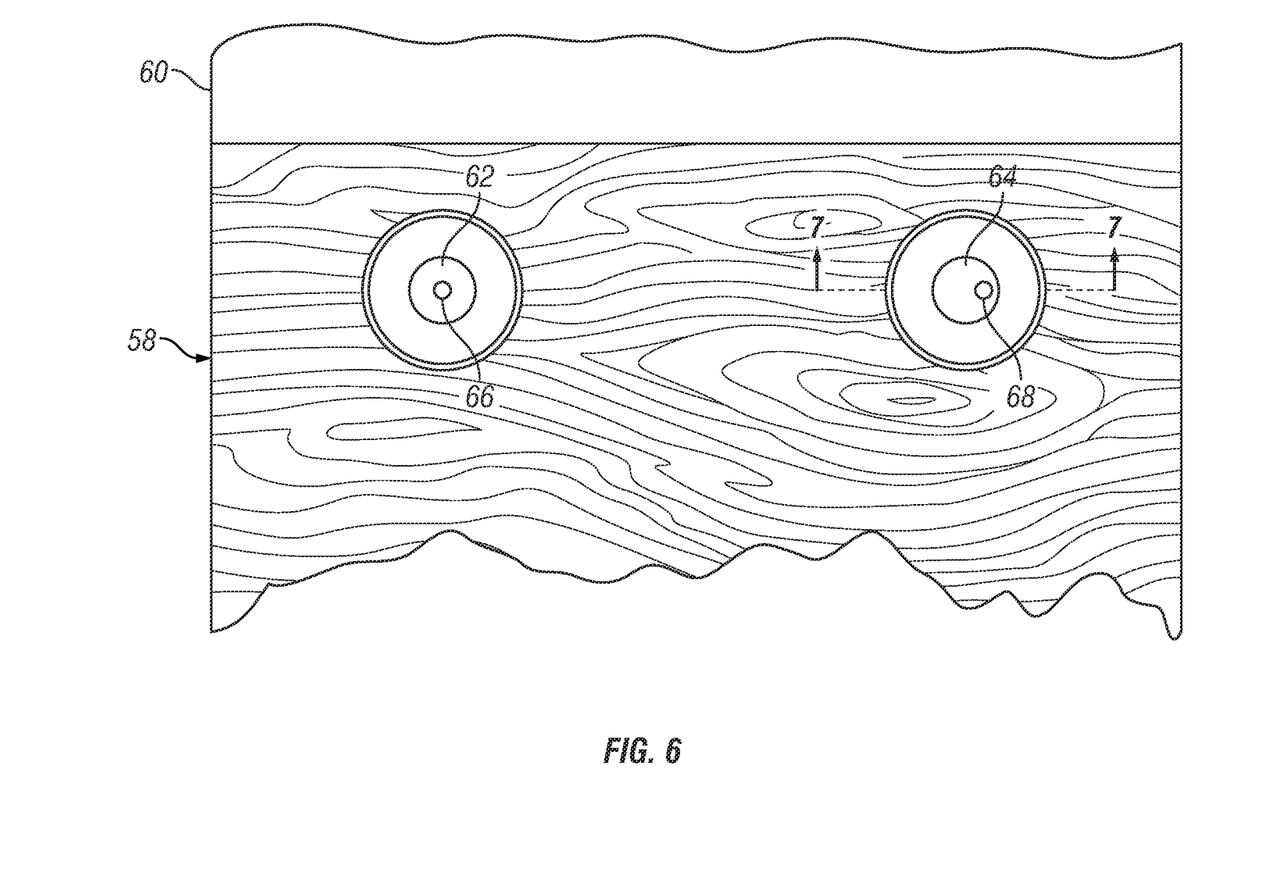
FIG. 6 is a plan view illustrating the first body arranged over the second body for attachment thereto and further depicting an eccentric arrangement between an attachment opening of the first body and an attachment opening of the second body.

Attachment openings 66 and 68 are located on pedestal portions 72 and 74, respectively of instrument panel 60. Attachment opening 66 is substantially centered with respect to pedestal portion 72, but attachment opening 68 is positioned substantially off-center with respect to pedestal portion 74. This off-center arrangement has been exaggerated for purposes of illustration to depict the impact of stacked up tolerances FIG. 6 is a plan view illustrating close-out panel 58 and instrument panel 60 positioned adjacent one another and aligned for attachment. With continuing reference to FIGS. 1-5, as illustrated in FIG. 6, attachment opening 62 and attachment opening 66 are substantially concentrically aligned but attachment opening 64 and attachment opening 68 are substantially eccentric with respect to one another. Accordingly, while a standard fastener may inserted through attachment openings 62 and 66, any attempt to extend a standard fastener through attachment openings 64 and 68 would cause close-out panel 58 to move with respect instrument panel 60. This, in turn, would result either in misalignment of close-out panel 58 with respect to instrument panel 60 or, alternatively, the appearance of gaps and/or buckling between these two components. The scenario presented by attachment openings 64 and 68 in FIG. 6 calls for the use of fastener assembly 20.

Figure 7:
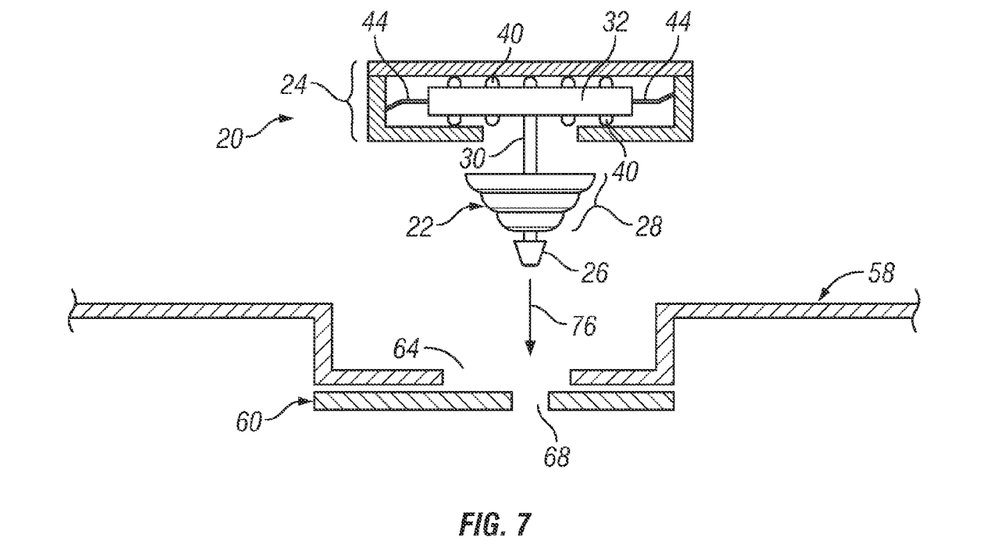
FIG. 7 illustrates fragmented portions of the first body and the second body in cross-section and further illustrates the fastener assembly of FIG. 1 partially in cross-section.

FIG. 7 illustrates a cross section through the line 7-7, depicted in FIG. 6 together with fastener assembly 20 positioned for insertion through attachment openings 64 and 68. Fastener assembly 20 has been illustrated with base component 24 illustrated in cross-section to allow the viewer to observe the movement of fastening component 22 with respect to base component 24 during insertion of fastener assembly 20. Fastener assembly 20 is moved in the direction indicated by arrow 76 towards attachment openings 64 and 68.

Figure 8:
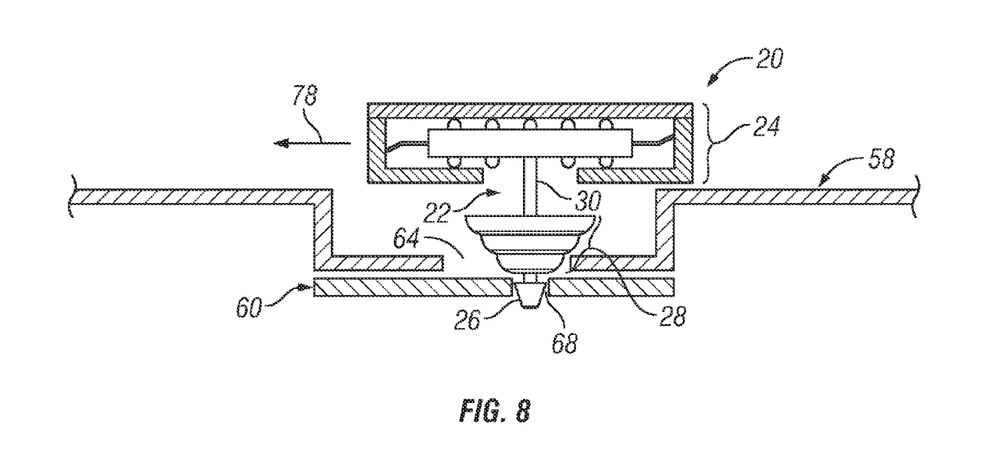
FIG. 8 is a view similar to the view illustrated in FIG. 7, with the fastener assembly moved into an insertion position with respect to the attachment opening of the second body.

FIG. 8 is a view similar to the view illustrated in FIG. 7. In FIG. 8, fastener assembly 20 has been moved towards attachment openings 64 and 68 such that lead-in portion 26 extends partially through attachment opening 68. With lead-in portion 26 positioned in attachment opening 68, base component 24 may be moved with respect to fastening component 22 in the direction indicated by arrow 78 while fastening component 22 remains stationary with respect to instrument panel 60.

Figure 9:
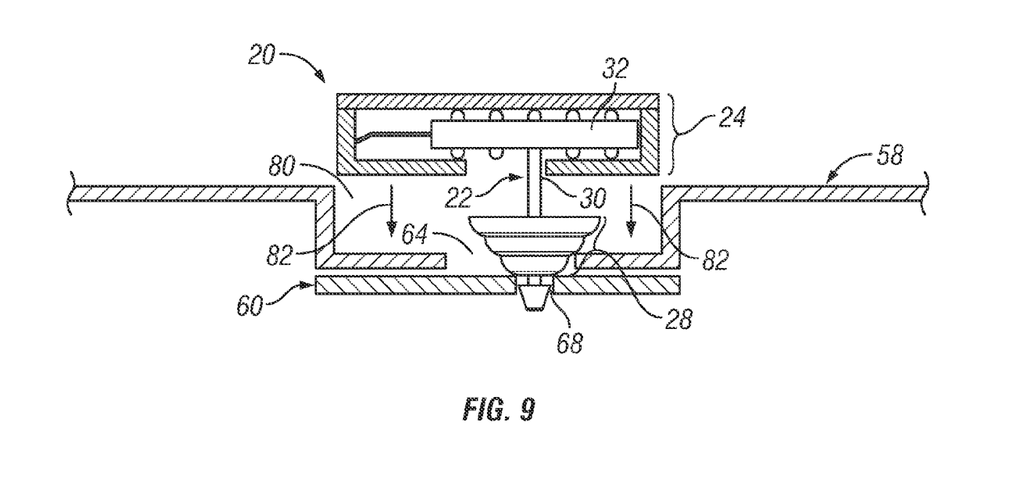
FIG. 9 is a view similar to the view illustrated in FIG. 8, with the fastener assembly moved into an insertion position with respect to attachment opening of the first body.

FIG. 9 is a view similar to the view illustrated in FIG. 8. In FIG. 9, base component 24 has been moved into alignment with a recess 80 associated with attachment opening 64. As a result, fastener assembly 20 may be moved in the direction indicated by arrows 82, into recess 80. As depicted in FIG. 9, disk portion 32 has moved within base component 24 and fastening component 22 is positioned eccentrically with respect to base component 24 in a manner that corresponds with the eccentric arrangement between attachment opening 64 and attachment opening 68.

Figure 10:
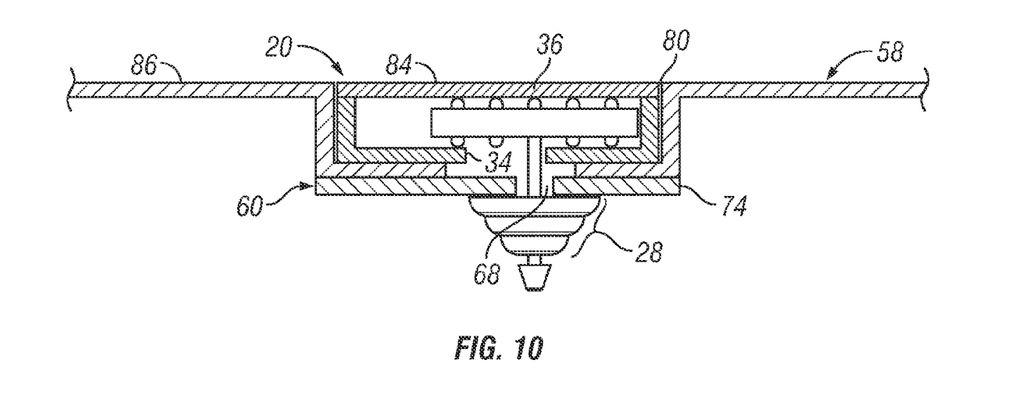
FIG. 10 is a view similar to the view illustrated in FIG. 9, with the fastener assembly completely inserted into the attachment openings of the first and second bodies, thereby joining the first and second bodies together.

FIG. 10 is a view similar to the view illustrated in FIG. 9. In FIG. 10, fastener assembly 20 is completely seated within recess 80, engagement portion 28 has moved entirely through attachment opening 68 and engages with an under side of pedestal portion 74 to prevent egress of fastener assembly 20 from recess 80. Similarly, collar member 34 is engaged with a floor of recess 80 and thereby inhibits further downward movement of fastener assembly 20. Configured and positioned in the manner illustrated in FIG. 10, fastener assembly 20 secures close-out panel 58 to instrument panel 60. Additionally, upper surface 84 of plate member 36 is positioned to be substantially flush with an upper surface 86 of close-out panel 58.

Figure 11:
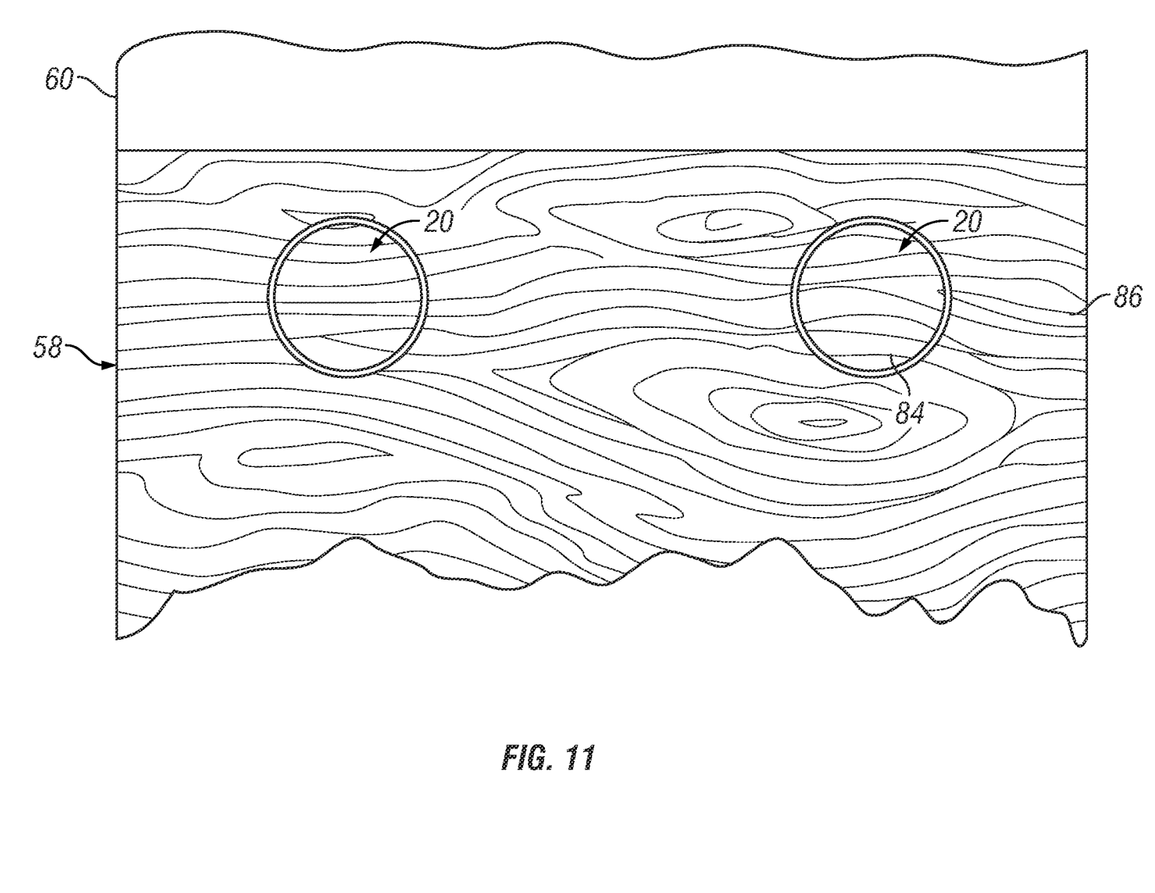
FIG. 11 is a plan view similar to FIG. 6, illustrating the first body and the second body joined together by a pair of fastener assemblies.

FIG. 11 is a plan view similar to the view illustrated in FIG. 6. In FIG. 11, close-out panel 58 has been joined to instrument panel 60 through the use of a pair of fastener assemblies 20. As illustrated, upper surface 84 of fastener assembly 20 is substantially flush of upper surface 86 of close-out panel 58. Additionally, a wood grain pattern has been molded into upper surface 84 of fastener assembly 20. Such a wood grain pattern comprises a class "A" surface that is suitable for presentation to an occupant of a vehicle. In some embodiments, the wood grain pattern imparted to upper surface 84 may be substantially identical to a wood grain pattern imparted to upper surface 86 of close-out panel 58. In some embodiments, fastener assembly 20 may have a color and a gloss that matches the color and gloss of close-out panel 58 which creates a visually contiguous appearance and which may be aesthetically pleasing.

Figure 12:
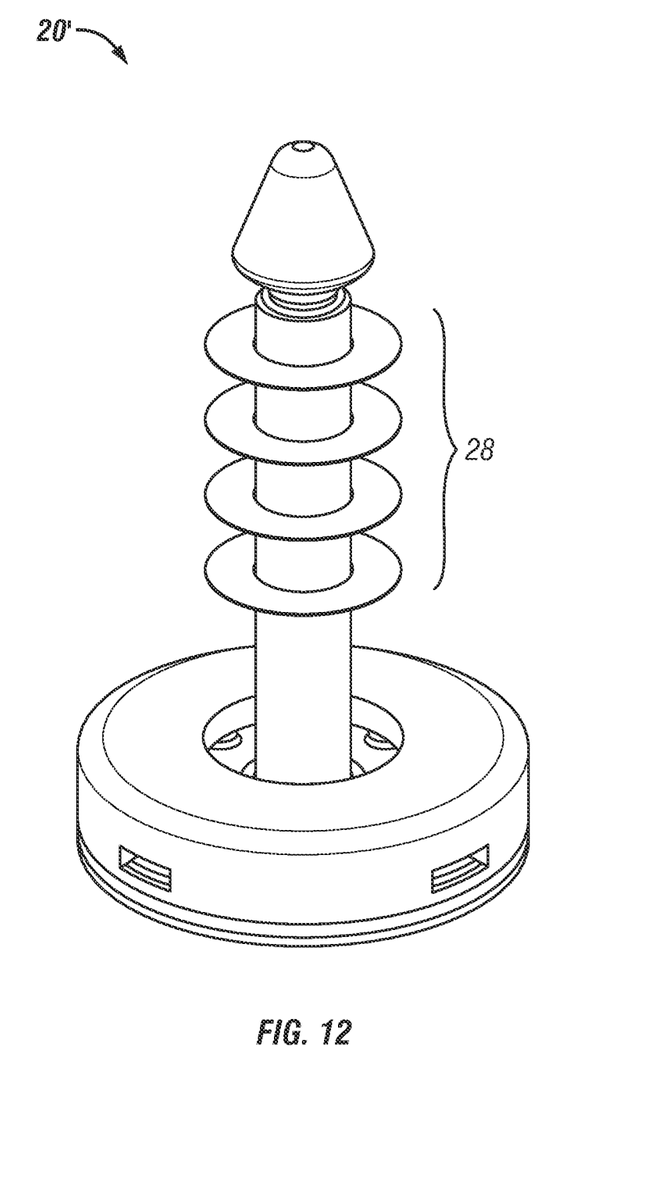
FIG. 12 is a perspective view illustrating an alternate embodiment of a fastener assembly made in accordance with the teachings of the present disclosure.

FIG. 12 is a perspective view illustrating an alternate embodiment 20' of a fastener assembly made in accordance with the teachings of the present disclosure. With continuing reference to FIGS. 1-11, alternate embodiment 20' is substantially identical to fastener assembly 20 with the exception that engagement portion 28' has a Christmas tree configuration.

Figure 13:
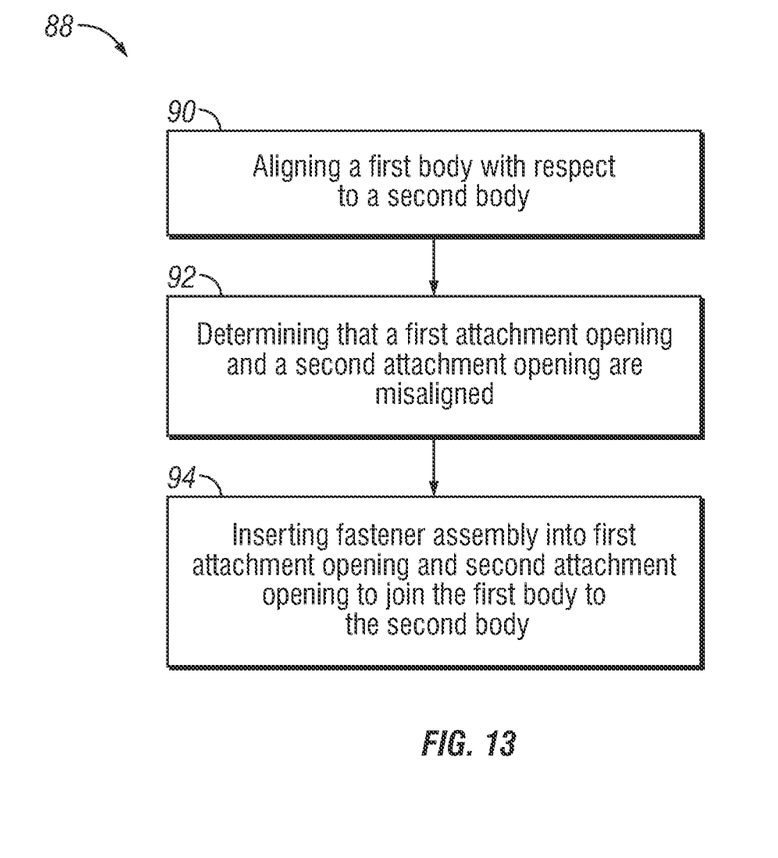
FIG. 13 is a block diagram illustrating the steps of a method for using the fastener assembly of FIG. 1.

FIG. 13 is a block diagram illustrating the steps of a method 88 for using fastener assembly 20 (see FIGS. 1-11). At block 90, a first body is aligned for attachment with respect to a second body. For example, close-out panel 58 and instrument panel 60 may be aligned for attachment as illustrated in FIG. 6.

At block 92, it is determined that an attachment opening of the first body and an attachment opening of the second body are misaligned. For example, attachment opening 64 and attachment opening 68 may be misaligned with respect to one another, as illustrated in FIG. 6.

At block 94, a fastener assembly, such as fastener assembly 20, described above, is inserted into each of the misaligned attachment openings. This step is illustrated in FIGS. 7-10 and is also described in detail above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A fastener assembly for joining a first body to a second body, the fastener assembly comprising:
    a base component configured for engagement with the first body, a surface of the base component comprising a class A surface;
    a fastening component connected to the base component and extending therefrom, the fastening component configured to translate for a predetermined distance with respect to the base component and further configured to engage the second body; and
    a biasing feature configured to urge the fastening component towards a substantially concentric arrangement with respect to the base component,
    wherein the base component comprises a plate member connected to a collar member, wherein the fastening component comprises a disk portion, a stud portion, and an engagement portion and wherein the disk portion is retained between the plate member and the collar member.

2. The fastener assembly of claim 1, wherein the fastening component includes a portion configured as a Christmas tree for engaging the first body.

3. The fastener assembly of claim 1, wherein the fastening component includes a threaded portion for engaging the first body.

4. The fastener assembly of claim 1, wherein the class A surface comprises a wood grain pattern.

5. The fastener assembly of claim 1, wherein the plate member comprises a class A surface on a side of the plate member opposite the collar member.

6. The fastener assembly of claim 1, wherein the collar member has an opening, wherein the stud portion extends through the opening, wherein the opening has a first dimension, wherein the stud portion has a diameter having a second dimension, and wherein the first dimension exceeds the second dimension.

7. The fastener assembly of claim 1, wherein the disk portion is configured to slide with respect to the plate member and the collar member.

8. The fastener assembly of claim 1, wherein the disk portion includes a plurality of raised surfaces that are configured for sliding engagement with respect to the plate member and the collar member.

9. The fastener assembly of claim 8, wherein the plurality of raised surfaces comprises a plurality of spherical surfaces.

10. The fastener assembly of claim 1, wherein the biasing feature comprises a plurality of biasing elements.

11. The fastener assembly of claim 10, wherein the plurality of biasing elements comprise a plurality of spring members.

12. The fastener assembly of claim 11, wherein the plurality of spring members comprises a plurality of curved spring arms extending in a generally outward direction from the fastening component and engaging the base component to maintain the fastening component in a substantially concentric relationship with respect to the base component.

13. The fastener assembly of claim 1, wherein the base component comprises a plate member connected to a collar member, wherein the fastening component comprises a disk portion, a stud portion, and an engagement portion, wherein the disk portion is retained between the plate member and the collar member, wherein the plate member comprises a class A surface on a side of the plate member opposite the collar member, wherein the collar member has an opening, wherein the stud portion extends through the opening, wherein the opening has a first dimension, wherein the stud portion has a diameter having a second dimension, and wherein the first dimension exceeds the second dimension, wherein the disk portion includes a plurality of raised spherical surfaces extending from opposite sides of the disk portion that are configured for sliding engagement with the plate member and the collar member, wherein the biasing feature comprises a plurality of curved spring arms extending in a generally outward direction from the disk portion and engaging an inner surface of the collar member to maintain the fastening component in a substantially concentric relationship with respect to the base component.

14. A method for using a fastener assembly to join a first body to a second body, the fastener assembly having a base component configured for engagement with the first body, a surface of the base component having a class A surface, a fastening component connected to the base component and extending therefrom, the fastening component configured to translate for a predetermined distance with respect to the base component and further configured to engage the second body, and a biasing feature configured to urge the fastening component towards a substantially concentric arrangement with respect to the base component, the method comprising the steps of:
    aligning the first body with respect to the second body;
    determining that a first attachment opening of the first body and a second attachment opening of the second body are misaligned; and
    inserting the fastener assembly into the first attachment opening and the second attachment opening to join the first body to the second body.

* * * * *